United States Patent
Wong et al.

(10) Patent No.: US 6,847,832 B2
(45) Date of Patent: Jan. 25, 2005

(54) SYSTEM AND METHOD FOR PROVIDING PHASE MATCHING WITH OPTIMIZED BEAM WIDTHS

(75) Inventors: Piu Bill Wong, Monte Sereno, CA (US); Alexander V. Tesler, Palo Alto, CA (US); Shimon B. Scherzer, Sunnyvale, CA (US)

(73) Assignee: Kathrein-Werke KG, Rosenheim (DE)

( * ) Notice: Subject to any disclaimer, the term of this patent is extended or adjusted under 35 U.S.C. 154(b) by 690 days.

(21) Appl. No.: 09/803,356

(22) Filed: Mar. 9, 2001

(65) Prior Publication Data

US 2002/0128027 A1 Sep. 12, 2002

(51) Int. Cl.$^7$ .................................................. H04Q 7/00
(52) U.S. Cl. .................................. 455/562.1; 455/452.1
(58) Field of Search ........................... 455/561, 562.1, 455/450, 451, 452, 452.1

(56) References Cited

U.S. PATENT DOCUMENTS

| | | | |
|---|---|---|---|
| 5,907,816 A | 5/1999 | Newman et al. | |
| 6,347,220 B1 * | 2/2002 | Tanaka et al. | 455/277.2 |
| 6,404,803 B1 * | 6/2002 | Wang et al. | 375/148 |
| 6,597,927 B1 * | 7/2003 | Eswara et al. | 370/334 |

FOREIGN PATENT DOCUMENTS

WO    WO 99/14870    3/1999

OTHER PUBLICATIONS

U.S. Appl. No. 09/229,482, Scherzer.
U.S. Appl. No. 09/803,718, Narasimhan et al.
PCT Search Report (PCT/US02/06446) dated Jul. 2, 2002.

* cited by examiner

Primary Examiner—Nick Corsaro
(74) Attorney, Agent, or Firm—Fulbright & Jaworski LLP

(57) ABSTRACT

Systems and methods providing analysis of channel characteristics for determining a optimum beam configuration for use therein are shown. Preferably, the direction and angle spread for subscriber units are determined in order to provide a beam for use therewith. According to a preferred embodiment, forward link characteristics are emulated in the reverse link in order to identify an optimum beam configuration. This optimum beam configuration is then preferably adapted for use in the forward link. Preferably, the present invention operates to recognize subscriber units which are spatially separated such that the optimized beams may be utilized in providing simultaneous communications therewith.

43 Claims, 4 Drawing Sheets

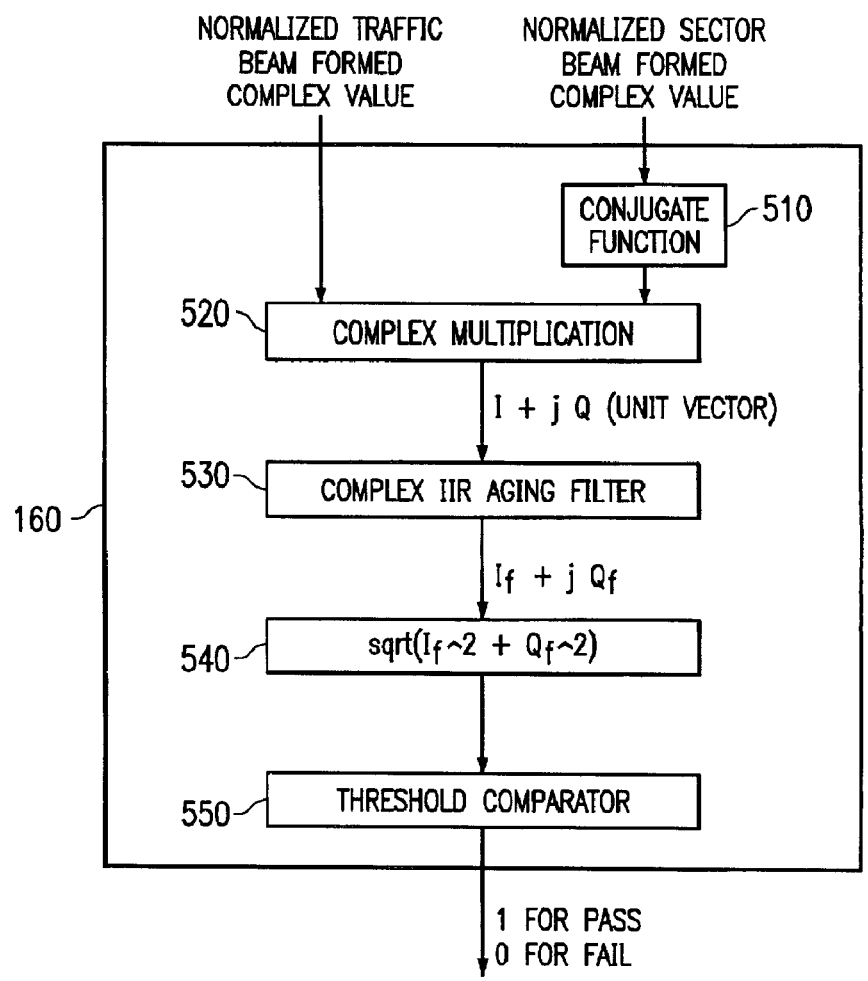

SYSTEM AND METHOD FOR PROVIDING PHASE MATCHING WITH OPTIMIZED BEAM WIDTHS

RELATED APPLICATIONS

The present application is related to copending and commonly assigned U.S. patent applications Ser. No. 09/229,482 entitled "Practical Space-Time Radio Method for CDMA Communication Capacity Enhancement" filed Jan. 13, 1999, which is a continuation-in-part of U.S. Pat. No. 6,108,565 entitled "Practical Space-Time Radio Method for CDMA Communication Capacity Enhancement," and application number [47586-P063US-10026081] entitled "Space-Time and Space-Frequency Hopping for Capacity Enhancement of Mobile Data Systems" concurrently filed herewith, the disclosures of all of which are hereby incorporated herein by reference.

TECHNICAL FIELD

The invention relates generally to wireless communications and, more particularly, to providing phased matched beam forming.

BACKGROUND

In wireless communication systems in particular, communication quality and communication capacity often have an inverse relationship. For example, as communication capacity is increased, such as through more dense reuse of traffic channels, signal quality may be decreased, such as through each such traffic channel experiencing higher levels of interference energy. Accordingly, wireless communication service providers must often balance providing desired levels of communication capacity with service quality issues.

In code division multiple access (CDMA) networks, for example, a number of communication signals are allowed to operate over the same frequency band simultaneously. Each communication unit is assigned a distinct, pseudo-random, chip code which identifies signals associated with the communication unit. The communication units use this chip code to pseudo-randomly spread their transmitted signal over the allotted frequency band. Accordingly, signals may be communicated from each such unit over the same frequency band and a receiver may despread a desired signal associated with a particular communication unit. However, despreading of the desired communication unit's signal results in the receiver not only receiving the energy of this desired signal, but also a portion of the energies of other communication units operating over the same frequency band. Accordingly, CDMA networks are interference limited, i.e., the number of communication units using the same frequency band, while maintaining an acceptable signal quality, is determined by the total energy level within the frequency band at the receiver.

It is therefore desirable to control the amount of energy radiated within a particular service area to thereby reduce interfering energy experienced by subscriber units operating therein. For example, in the aforementioned CDMA networks, transmitted signals are often power controlled to reduce energy transmitted within the CDMA frequency band while maintaining sufficient power to provide an acceptable signal at a receiving unit. Through intelligent power control, excess energy within the service area may be limited and, therefore, signal quality improved and/or capacity increased.

Further capacity and/or signal quality improvement may be provided in communication systems through the use of directional antenna beams in the communication links. For example, adaptive array antennas may be utilized to provide enhanced signal quality through advanced "beam forming" techniques as shown and described in the above referenced patent application entitled "Practical Space-Time Radio Method for CDMA Communication Capacity Enhancement." For example, angle of arrival (AOA) information determined from a received signal at an adaptive array antenna may be utilized in accurately determining beam forming coefficients for use in providing narrow beams the reverse link in order to provide improved capacity.

However, the use of such narrow beams in providing communications links, although generally effective in containing the area in which signal energy is radiated or from which radiated energy is accepted, introduces unique problems associated with their implementation. For example, cellular or personal communication services (PCS) systems using CDMA communication techniques often utilize both a pilot signal and a traffic signal to establish communications. The pilot signal generally provides a known signal and is used by receiving devices in demodulating a traffic signal. In the forward link, i.e, the base station to subscriber user link, a common pilot signal is typically used for multiple subscriber units, such as all subscriber units in a cell or a sector. Accordingly, it is typically desirable to provide this pilot signal throughout an area in which multiple subscriber units are likely to be located.

The use of narrow beams for reducing radiated and/or accepted energy as discussed above can be problematic with respect to use of such a pilot signal. For example, if the pilot signal were to be transmitted in a narrow beam corresponding to the traffic signal of a particular subscriber unit, other ones of the plurality of subscriber units may not receive the pilot signal for use in demodulating their corresponding traffic signal. Accordingly, it is often desirable to provide the pilot signal in an area larger than that of the narrow beam associated with a particular subscriber unit. However, this often results in a phase mismatch problem at one or more of the subscriber units. Specifically, as the link channel associated with the pilot signal (e.g. wide beam) is not the same as that of the link channel associated with the traffic signal (e.g. narrow beam), the phase information extracted from the pilot signal may no longer accurately correlate with the traffic signal as received by a subscriber unit. Although perhaps providing phase matching to within acceptable limits for lower order modulation schemes, such as BPSK, such a phase mismatch is likely to result in unacceptable communication errors, such as an excessive bit error rate (BER), in higher order modulation schemes, such as QPSK, 8PSK, etcetera.

Accordingly, a need exists in the art for systems and methods which provide for the use of optimized beams, such as beams having a minimized or otherwise reduced beam width, to thereby control the amount of interference energy radiated and/or accepted, while providing a desired and predictable signal phase relationship. A further need exists in the art for such systems and methods to provide the phase relationship relative to a pilot signal associated with an antenna beam having a size and/or shape substantially different than that of a corresponding traffic signal communicated in an optimized beam configuration.

SUMMARY OF THE INVENTION

The present invention is directed to a system and method which optimizes communication links with reference to phase matching aspects of the link channel. For example, a preferred embodiment of the invention utilizes direction finding and angle spread estimation in order to optimize a communication link beam and, thereby, provides traffic channel communications in a beam having a minimized beam width while maintaining a phase match with respect to a pilot signal to within a range sufficient to accurately decode the traffic signal.

According to a preferred embodiment of the present invention, a small aperture antenna array is utilized both to provide direction finding according to the present invention and for providing beam forming to provide an optimized link according to the present invention. The use of a small aperture antenna array according to the preferred embodiment is facilitated in part through preferred embodiment methodology of analyzing various beams formed using such an array, and determining a beam which is optimized for use with the direction and angle spread characteristics associated with a particular subscriber unit. Accordingly, the use of large aperture antenna arrays, providing a higher level of direction finding resolution, may be avoided as the more precise direction information is foregone in favor of angle spread information in conjunction with direction information utilized according to the present invention.

Operation according to a preferred embodiment of the present invention, a plurality of beam configurations are analyzed with respect to a particular subscriber unit. Accordingly, a phase mismatch, associated with a traffic signal as communicated within each such beam configuration, with respect to a pilot signal communicated in a beam configured to serve a plurality of subscriber units may be estimated. The preferred embodiment of the invention operates to select a particular beam configuration for providing traffic signal communication from the plurality of beam configurations analyzed. Accordingly, an optimum beam configuration may be selected which provides an acceptable level of phase matching between the traffic signal and a corresponding pilot signal, based upon actual link conditions including the direction and angle spread associated with the particular subscriber, and which minimizes interfering energy in the system.

In providing an optimized link in the forward link, a preferred embodiment of the present invention operates to emulate conditions of the forward link in the reverse link and estimates the forward link optimum beam configuration from reverse link measurements. For example, in CDMA cellular or PCS systems, subscriber units typically each have a unique pilot signal associated therewith for use in the reverse link, although a plurality of subscriber units utilize a common pilot signal in the forward link. Accordingly, it is typically desirable to provide the forward link pilot signal in a sector, or similar wide beam, in the forward link to make the common pilot signal available to a plurality of subscriber units disposed throughout a region of a service area.

A preferred embodiment of the present invention operates to analyze reverse link communications for forward link beam forming by comparing a particular subscriber unit's pilot signal as received through a beam configuration corresponding to that used for the common pilot in the forward link, e.g., a sector beam configuration, and the particular subscriber unit's traffic signal as received through a plurality of different beam configurations, e.g. various widths and/or bore sights (directions) of beams. A reverse link traffic signal optimum beam configuration is preferably identified from among the plurality of configurations analyzed. For example, a reverse link traffic signal beam configuration which provides a minimized beam width while maintaining an acceptable phase match with respect to the corresponding pilot signal as received in the pilot signal wide beam configuration may be identified as an optimum traffic signal beam configuration according to the present invention. Of course, embodiments of the present invention may rely upon additional or other parameters in identifying an optimum beam configuration, such as receive signal strength, carrier to interference levels, and the like. For example, an embodiment of the present invention compares the loss in dB resulting from phase mismatch to the loss in gain in dB associated with use of a particular traffic signal beam configuration in identifying an optimum beam configuration.

An optimum forward link traffic beam configuration is preferably then determined based upon the reverse link beam configuration identified as optimum. For example, because differences between the forward and reverse link channels are known, such as differences in the frequencies used in the two channels, the beam forming parameters of the reverse link beam identified as optimum may be altered according to the present invention for implementation in forward link beam forming to result in substantially the same beam being formed in the forward link despite differences between the two channels. Accordingly, the beam implemented in providing communications in the forward link according to this embodiment is configured for the direction and angle spread associated with the particular subscriber unit.

A preferred embodiment utilizes optimized communication links provided according to the present invention to provide communication system capacity increases. For example, through providing forward link beams which are optimized to provide a minimized beam width while maintaining a suitable phase match, embodiments of the present invention may operate to provide a plurality of simultaneous forward link beams, serving a plurality of subscriber units simultaneously. Accordingly, where a traditional communication system would be limited to providing communications during a particular instant in time within a particular region of a service area to a single subscriber unit, the present invention may operate to provide communications to a plurality of subscriber units, thereby providing increased communication capacity.

A technical advantage of the present invention is presented in that communication links are optimized to provide acceptable, and even improved, communications while minimizing interference energy experienced by various systems within the communication network.

A further technical advantage of the present invention is that optimization of links for which a great deal of link channel information may not be directly available is provided through emulation of such link conditions in a corresponding link for which link channel may be directly measured.

A still further technical advantage of the present invention is provided in communication system capacity increases which may be realized through implementation of link optimization according to the present invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 5 shows alternative preferred embodiment direction finding and angle spread estimator circuitry.

DETAILED DESCRIPTION

In order to describe the concepts of the present invention reference shall be made herein to a preferred embodiment communication system providing cellular or PCS type communications according to a code division multiple access (CDMA) and frequency division duplexing (FDD) protocol, such as used in CDMA-2000 (IS-2000) radio configuration three (RC3). However, it should be appreciated that the concepts of the present invention are applicable to any number of communication systems, including those using frequency division multiple access (FDMA), time division multiple access (TDMA), time division duplexing (TDD). Moreover, it should be appreciated that preferred embodiments of the present invention operate to provide space division multiple access (SDMA) for increased communication capacity where typical system configurations, such as the aforementioned CDMA-2000 systems, do not provide multiple access based upon spatial characteristics, such as within a sector.

Figure 1:
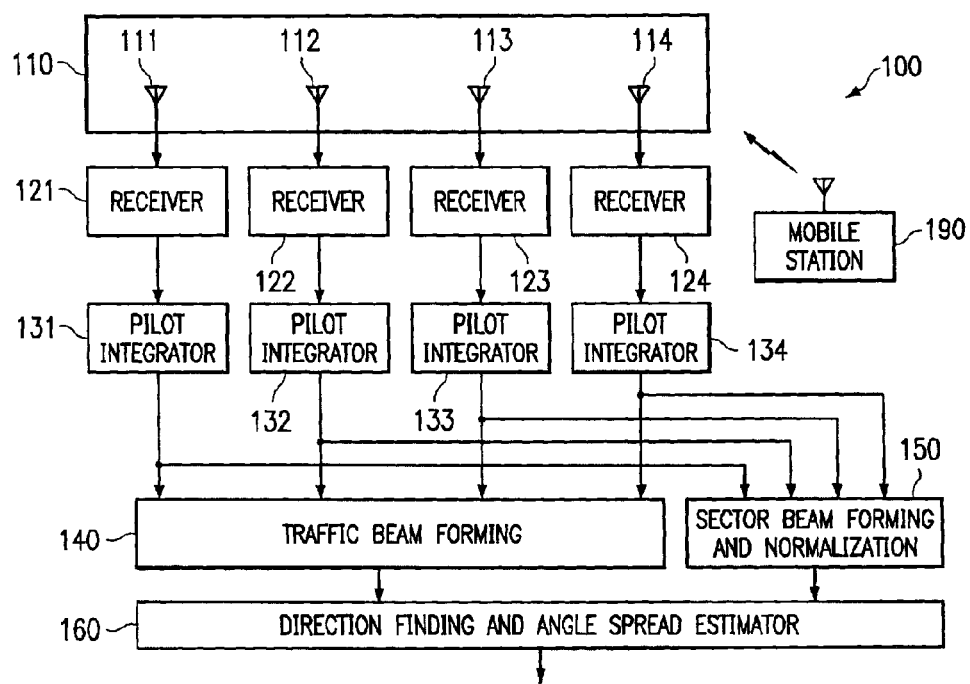
FIG. 1 shows a base station adapted according to a preferred embodiment of the present invention.

Directing attention to FIG. 1, a base station adapted according to a preferred embodiment of the present invention is shown as base station 100. Base station 100 of the illustrated embodiment includes narrow aperture antenna array 110 having antenna elements 111–114 disposed in a predetermined geometry for use in beam forming as is well known in the art. It should be appreciated that the use of four antenna elements (or antenna element columns) as illustrated is not required according to the present invention and, therefore, other numbers of antenna elements may be utilized, if desired. However, the preferred embodiment of the present invention utilizes techniques more fully described herein below to optimize antenna beam configurations without requiring a large aperture antenna array to provide high resolution direction finding. For example, preferred embodiments of the present invention utilize direction and angle spread information, as may be determined using a narrow aperture antenna array, in providing optimized antenna beam configurations. Of course, large aperture antenna arrays may be utilized according to the present invention, such as where such antenna systems are used to provide increased diversity or are otherwise already available.

Antenna elements 111–114 of antenna array 110 of the illustrated embodiment are each individually coupled to pilot integrators 131–134 through receivers 121–124, respectively. Pilot integrators 131–134 of the illustrated embodiment are each coupled to traffic beam forming circuitry 140 and sector beam forming circuitry 150 which is coupled to direction finding and angle spread estimator circuitry 160 in the illustrated embodiment.

It should be appreciated that, although a sector beam and sector beam forming circuitry is referenced herein with respect to the illustrated embodiment, there is no limitation to the use of the invention with sectors or even sectorized systems. Accordingly, reference herein to sector beam forming should be understood to include beam forming of a common use beam, whether associated with a sector or not.

Also shown in FIG. 1 is subscriber unit 190, such as may be a mobile handset or other communication system, in communication with base station 100. It should be appreciated that, although only a single subscriber unit is illustrated in order to present a illustration that is more easily understood, it is expected that base station 100 will be in communication with a plurality of subscriber units (not shown).

According to one embodiment of the present invention, base station 100 and subscriber unit 190 operate to provide wireless communication services according to CDMA-2000 protocols. Accordingly, base station 100 may provide communications within a particular portion (cell) of a service area (cellular network). Base station 100 may divide the particular portion (cell) of the service area into regions (sectors) as is common among such systems. Accordingly, base station 100 may include additional circuitry (not shown) associated with additional regions. For example, antenna array 110 may be relied upon to radiate and/or accept signals within a 120 degree sector of a cell and additional antenna arrays (not shown), preferably operated as described herein with respect to antenna array 110, may be relied upon to radiate and/or accept signals within other sectors of the cell associated with base station 100.

It should be appreciated that, although operation according to CDMA-2000 protocols is discussed herein, there is no limitation to the present invention operating with such protocols, nor even to operating with CDMA access schemes in general. As will be readily understood by one of ordinary skill in the art, the concepts of the present invention are applicable to any number of communication protocols. However, the concepts of the present invention are particularly applicable to particular communication protocols, such as the aforementioned CDMA-2000 protocols, where a common pilot, or other such signal common to multiple subscriber units, is used with respect to a plurality of individual traffic signals.

In operation according to the illustrated embodiment, subscriber unit 190 communicates with base station 100 using both a pilot signal and a traffic signal, where the pilot signal is utilized in demodulating the traffic signal. According to the CDMA-2000 protocol, each subscriber unit transmits a traffic signal and a unique pilot signal associated therewith to the base station (reverse link). However, the base station transmits a traffic signal unique to each subscriber unit and a common pilot corresponding to a plurality of such traffic signals (forward link). Accordingly, it is typically desirable for base station 100 to provide the common pilot signal throughout an area in which multiple subscriber units might operate, such as throughout a cell or a sector of a cell.

It is desirable to control the radiation and acceptance of radiated energy in order to provide communications having an acceptable or tolerable level of interference energy and/or to provide desired communication capacity. For example, the aforementioned CDMA systems are interference limited and therefore the capacity of such systems is directly affected through the control of interfering energy. Accordingly, CDMA networks often employ power control with respect to transmitted signals to reduce energy transmitted within the CDMA frequency band while maintaining sufficient power to provide an acceptable signal at a receiving unit. Further capacity and/or signal quality improvement may be provided in communication systems through the use of directional antenna beams in the communication links. For example, adaptive array antennas may be utilized to provide enhanced signal quality through advanced "beam forming" techniques as shown and described in the above referenced patent application entitled "Practical Space-Time Radio Method for CDMA Communication Capacity Enhancement."

However, the use of such narrow beams in providing communications links, although generally effective in containing the area in which signal energy is radiated or from which radiated energy is accepted, introduces problems associated with the aforementioned pilot signals and corresponding traffic signals. For example, as discussed above, it is typically desirable to provide a common pilot signal throughout a particular region in which a plurality of subscriber units may be disposed.

Although it is possible to form a narrow beam to provide a traffic channel to a particular subscriber unit, and thereby reduce the interfering energy experienced by other ones of the plurality of subscriber units, this results in the subscriber unit's traffic signal experiencing different link channel characteristics than the corresponding pilot signal utilized in demodulating the traffic signal. For example, where a narrow beam utilized in communicating a traffic signal is substantially more narrow than the angle spread (the spread of angles from which a signal is received due to channel characteristics such as scattering zones, multi-path conditions, etcetera) associated with the link channel, a phase mismatch between the pilot signal and the traffic channel may result. Specifically, as the link channel associated with the pilot signal is not the same as that of the link channel associated with the traffic channel, the phase information extracted from the pilot signal may no longer accurately correlate with the traffic signal as received by a subscriber unit. Although perhaps providing phase matching to within acceptable limits for lower order modulation schemes, such as BPSK, such a phase mismatch is likely to result in unacceptable communication errors, such as an excessive bit error rate (BER), in higher order modulation schemes, such as QPSK, 8PSK, etcetera. However, matching the traffic signal beam characteristics to that of the common pilot signal beam characteristics by definition provides the traffic signal energy of a particular subscriber unit to a plurality of other subscriber units and, thus, results in undesired interference energy.

Accordingly, a preferred embodiment of the present invention operates to optimize beam configurations to provide a traffic signal beam having a reduced coverage area while maintaining a desired level of phase matching with respect to a corresponding pilot signal. Preferably, the present invention operates to determine channel characteristics experienced by particular subscriber units in order to optimize beam configurations accordingly. Most preferably, the present invention utilizes subscriber unit direction information with respect to a base station in communication therewith along with angle spread information in order to provide a beam configuration optimized for link channel conditions.

However, according to particular communication protocols or system implementations, there may be insufficient information with respect to a link channel (whether forward or reverse link) to directly determine information for optimization according to preferred embodiments of the present invention. Accordingly, preferred embodiments of the present invention emulate link attributes of one link channel (such as the forward link channel) in another link channel (such as the reverse link channel) in order to determine an optimized beam configuration for the link channel for which sufficient information is not directly available.

Referring still to FIG. 1, circuitry of base station 100 may be utilized in analyzing link conditions to thereby provide optimized beam configurations. Specifically, according to a preferred embodiment, signals as received by each of antennas 111–114 are provided to corresponding ones of receivers 121–124 for manipulation of the received radio frequency signal for use by other circuitry of base station 100. For example, receivers 121–124 may provide conversion from an air link radio frequency to an intermediate frequency compatible with circuitry of base station 100. Additionally or alternatively, receivers 121–124 may provide conversion of signals from analogue to digital and/or provide in-phase (I) and quadrature (Q) information. Similarly, receivers 121–124 may provide signal filtering, gain adjustment, noise cancellation, and/or other signal processing as is well known in the art.

The received signals processed by receivers 121–124 are preferably provided to corresponding ones of pilot integrators 131–134. Pilot integrators 131–134 preferably integrate a pilot signal associated with a subscriber unit. The integration period is preferably sufficiently long to provide a desired level of gain with respect to the pilot signal, while being sorter than the Doppler period, i.e., it is desirable to have an integration period sufficient to enhance the pilot signal as a reference to demodulate the traffic signal without being long enough to experience substantial changes in the channel. For example, preferred embodiments of the present invention provide an integration period of from about 1 millisecond to a few (e.g., approximately 3) milliseconds. It should be appreciated that the actual length of integration period which may be used is dependent upon parameters such as the mobility of the subscriber units, service area topology, and even the frequencies at which communication is provided.

The integrated pilot is preferably provided to beam forming circuitry for forming and analysis of a plurality of reverse link beams. Accordingly, the illustrated embodiment provides the integrated pilot for each antenna element signal path to traffic beam forming circuitry 140 and sector beam forming circuitry 150.

In operation according to a preferred embodiment, sector beam forming circuitry 150 preferably applies complex weighting to the integrated pilots of each, antenna element signal path, or some subset thereof, to thereby provide a complex value beam corresponding to a beam utilized in providing a common pilot in the forward link. Accordingly, sector beam forming circuitry 150 provides emulation of link attributes of the forward link common pilot in the reverse link.

Figure 2:
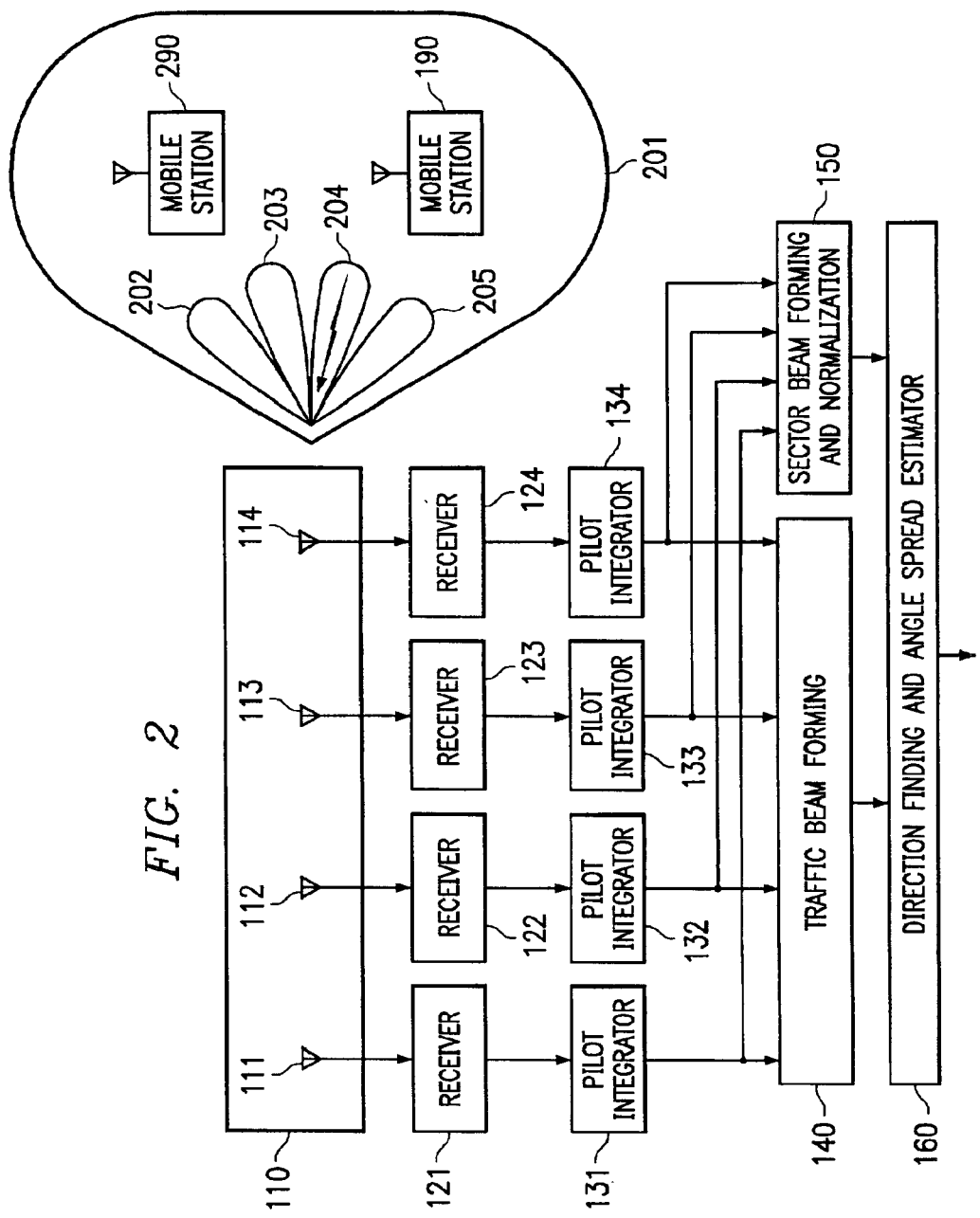
FIG. 2 shows reverse link beam forming using the preferred embodiment base station circuitry of FIG. 1.

Directing attention to FIG. 2, beam forming as provided by sector beam forming circuitry 150 and traffic beam forming circuitry 140 is represented graphically. For example, the aforementioned sector beam formed by sector beam forming circuitry 150 is represented as beam 201. Likewise, traffic beams formed by traffic beam forming circuitry 140 are represented as beams 202–205. As can be appreciated from FIG. 2, beam 201 is adapted to provide communication throughout an area in which multiple subscriber units (subscriber units 190 and 290) are located.

Traffic beam forming circuitry 140 preferably applies complex weighting to the integrated pilots of each antenna element signal path, and/or subsets thereof, to thereby provide a plurality of complex value beams, such as represented by beams 201–205 of FIG. 2. Complex weighting may be applied by traffic beam forming circuitry 140 in various combinations to form substantially any beam configuration possible using antenna array 110. For example, where the common pilot sector beam is 120 degrees, traffic beam forming circuitry 140 may provide weighting of integrated pilot signals to form at least one beam having a bore sight direction in each 1 degree increment (at least 120 traffic beams). Preferably, such an embodiment would provide variations of traffic beams at each bore sight direction, such as using various beam widths, different gain, etcetera. A preferred embodiment configuration of traffic beam forming circuitry 140 provides six variations at each bore sight direction in addition to forming a traffic beam corresponding to the sector beam characteristics which, in the aforementioned 120 degree sector embodiment, provides six beams at each 1 degree increment (beams having a same bore sight and varying in antenna gain in substantially equal increments (e.g. 0 dB, 1 dB, 2 dB, 3 dB, 4 dB, 5 dB)), and one beam corresponding to the sector beam configuration. Such an embodiment, therefore, provides 721 traffic beam configurations.

Of course, other combinations of traffic beam forming may be utilized according to the present invention. For example, the number of traffic beams formed, and therefore analyzed, may be reduced by providing beams having bore sights offset in larger increments, such as every 2 degrees. Additionally or alternatively, traffic beam parameters may be adjusted, such as establishing a lower maximum antenna gain or a higher minimum antenna gain in the plurality of antenna beams of the bore sight increments, to thereby reduce the number of variations of traffic beams which are to be formed and analyzed according to the present invention. Moreover, combinations of the above may be implemented. For example, a hierarchal scheme may be implemented wherein antenna beams having the most antenna gain associated therewith (narrow beams) may be formed for each bore sight degree (or some other smallest increment), while antenna beams having a lesser antenna gain associated therewith (wider beams) may be formed for every other bore sight degree (or some other increased increment), while antenna beams having yet lesser antenna gain associated therewith (still wider beams) may be formed for every third bore sight degree (or some other further increased increment), etcetera.

To aid in analysis of traffic beams analyzed according to preferred embodiments of the present invention, the complex value beam formed by sector beam forming circuitry 150 is preferably normalized. Accordingly, sector beam forming circuitry 150 of the preferred embodiment normalizes the sector beam formed using the integrated pilot signal of the antenna element signal paths to have a magnitude of 1. It should be appreciated that normalization may be omitted with respect to the sector beam and/or provided with respect to the traffic beams of the present invention, depending upon the methodology implemented by direction finding and angle spread estimator 160. For example, a preferred embodiment of direction finding and angle spread estimator 160, discussed below with respect to FIG. 5, utilizes both normalized traffic beam formed complex values and normalized sector beam formed complex values. Accordingly, sector beam forming circuitry 150 and traffic beam forming circuitry 140 of such an embodiment normalizes the beams formed using the integrated pilot signal of the antenna element signal paths to have a magnitude of 1.

The beams formed by traffic beam forming circuitry 140 and sector beam forming circuitry 150 are preferably further processed by direction finding and angle spread estimator circuitry 160 of the illustrated embodiment. Direction finding and angle spread estimator circuitry 160 of the preferred embodiment operates to analyze each traffic beam, or some subset thereof, formed by traffic beam forming circuitry 140 with respect to sector beam forming circuitry 150 to thereby identify an optimum beam configuration with respect to the direction of the subscriber unit with respect to base station 100 and the angle spread experienced in the channel between base station 100 and the subscriber unit. For example, direction finding and angle spread circuitry 160 may operate to compare the loss in dB resulting from phase mismatch to the loss in gain in dB associated with use of a particular traffic signal beam configuration in identifying an optimum beam configuration.

Preferably, all traffic beams formed by traffic beam forming circuitry 140 are processed by direction finding and angle spread estimator 160 in parallel in order to minimize the time required to identify an optimized beam configuration. Of course, where processing power is limited and/or where time to identify an optimized beam is not critical, such as in a system in which subscriber units are not highly mobile, traffic beams or groups thereof may be processed serially, if desired.

Figure 3:
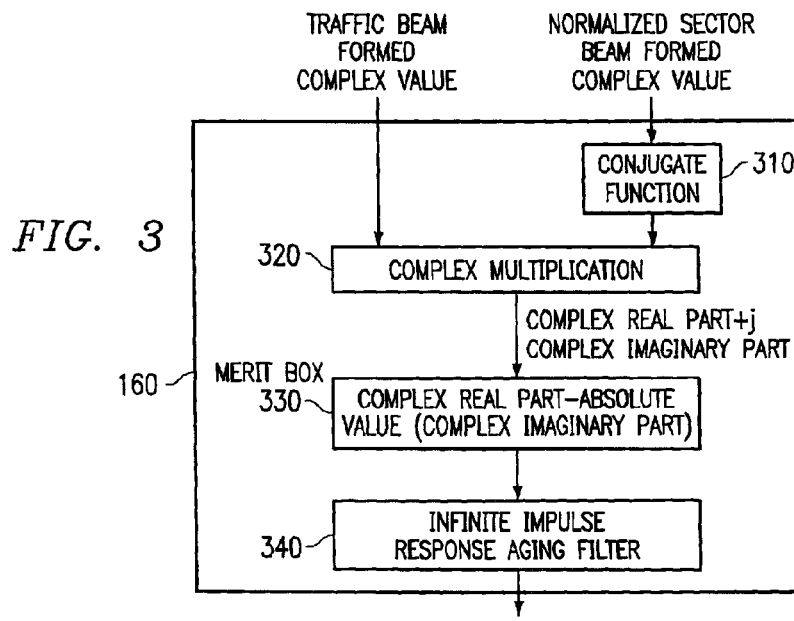
FIG. 3 shows preferred embodiment direction finding and angle spread estimator circuitry.

Directing attention to FIG. 3, a preferred embodiment of direction finding and angle spread estimator circuitry of the present invention is shown. According to the preferred embodiment of FIG. 3, direction finding and angle spread estimator circuitry accepts traffic beam formed complex values provided by traffic beam forming circuitry 140 and normalized sector beam formed complex values provided by sector beam forming circuitry 150. Conjugate function 310 preferably takes the conjugate of the normalized sector beam formed complex value.

Thereafter, complex multiplication 320 multiplies the conjugate of the normalized sector beam formed complex value with each of the traffic beam formed complex values. For example, complex multiplication 320 provides independent multiplication of each of the 721 traffic beam formed complex values provided by traffic beam forming circuitry 140 of the above described embodiment.

Merit box 330 is preferably provided to measure both the strength of the received traffic beam formed signals and its phase coherency with the sector beam formed signals. It should be appreciated that the particular functions provided by merit box 330, therefore, may vary depending upon the communication protocols utilized by base station 100. For example, the embodiment illustrated in FIG. 3 assumes that QPSK modulation, as used in a CDMA-2000 forward link, is utilized and, therefore, subtracts the absolute value of the complex imaginary part of the complex multiplication from the complex real part. However, if a BPSK modulation scheme is used, for example, such as with a CDMA-95 (IS-95) forward link, merit box 330 may take only the complex real part. Accordingly, it should be appreciated that merit box 330 provides a matrix to interpret the comparison of the sector beam with each of the traffic beams.

Infinite impulse response aging filter 340 is preferably provided to integrate the comparisons of each traffic beam over time. Infinite impulse response aging filter 340 preferably has an equivalence time constant of about a few (e.g. 3) tens of milliseconds to a few (e.g. 3) tens of seconds, most preferably from about 1 to 2 seconds, to mitigate the effects of anomalies. Of course, it should be appreciated that other filtering techniques, such as running window filtering, may be utilized according to the present invention.

According to a preferred embodiment, the outputs of infinite impulse response aging filter 340 for all traffic beam formed signals are compared and the traffic beam that gives the maximum value (the traffic beam having the maximum combined received signal strength and phase correlation) is identified as the optimum traffic beam configuration. However, in the illustrated embodiment, as the forward and reverse links use different carrier frequencies, the beam forming parameters of the traffic beam identified as the optimum traffic beam configuration are further processed to provide a forward link beam configuration adapted for use with a different frequency. For example, the difference in carrier frequencies is known and, therefore, the beam forming parameters of the identified optimum traffic beam configuration may be adjusted to provide a same beam in forward link using a different carrier frequency.

Accordingly, using information determined in direction finding and angle spread estimator circuitry 160, transmit circuitry of base station 100 may be utilized to provide an optimized narrow beam for forward link communication with a subscriber unit, such as subscriber unit 190, which is adapted to provide a suitable communication link when a corresponding pilot signal is provided in a forward link beam having substantially different characteristics.

Directing attention to FIG. 5, an alternative preferred embodiment of direction finding and angle spread estimator circuitry of the present invention is shown. According to the embodiment of FIG. 5, direction finding and angle spread estimator circuitry 160 accepts normalized traffic beam formed complex values provided by traffic beam forming circuitry 140 and normalized sector beam formed complex values provided by sector beam forming circuitry 150. Conjugate function 510 preferably takes the conjugate of the normalized sector beam formed complex value.

Thereafter, complex multiplication 520 multiplies the conjugate of the normalized sector beam formed complex value with each of the normalized traffic beam formed complex values. For example, complex multiplication 520 provides independent multiplication of each of the 721 traffic beam formed complex values provided by traffic beam forming circuitry 140 of the above described embodiment.

Infinite impulse response aging filter 530 is preferably provided to integrate the instantaneous results from complex multiplication 520 over time. Infinite impulse response aging filter 530 preferably has a time constant of about a few (e.g. 3) tens of milliseconds to a few (e.g. 3) tens of seconds, most preferably from about 1 to 2 seconds, to mitigate the effects of anomalies. Of course, it should be appreciated that other filtering techniques, such as running window filtering, may be utilized according to the present invention.

Merit box 540 is preferably provided to determine the magnitude of the result of the complex multiplication provided by complex multiplication 520. It should be appreciated that according to this embodiment, the magnitude determined in merit box 540 is indicative of the phase match or coherency between the signal of the sector beam and that of a traffic beam as both are normalized and the sector beam's conjugate is used in the multiplication. Although the embodiment illustrated in FIG. 5 shows use of the square root of the sum of the squares of the real and imaginary parts of the complex result of the complex multiplication, other functions may be utilized to determine the magnitude. For example, it is not necessary to take the square root of the sum of the squares of the real and imaginary parts to have magnitude information. Accordingly, it should be appreciated that merit box 540 provides a matrix to interpret the comparison of the sector beam with each of the traffic beams.

Threshold comparitor 560 is provided to analyze the results of merit box 540 and identify an optimum beam configuration according to the present invention. Preferably, threshold comparitor 560 compares the magnitude results from merit box 540 to a preselected threshold value and determines whether the results indicate an acceptable phase correlation or not, e.g. pass or fail. The threshold value is preferably selected based upon such considerations as the particular modulation technique used (e.g. QPSK, 8PSK, 64QAM, etcetera), acceptable signal quality, and the like. Accordingly, a threshold value used with respect to threshold comparitor 560 may be determined empirically or in simulations through experimentation with varying the degree of phase correlation with particular modulation techniques to determine an acceptable level of phase mismatch.

Having identified the traffic beams that provide at least a minimum level of phase correlation, the embodiment of FIG. 5 preferably selects from among these traffic beams to identify an optimum traffic beam. For example, knowing the complex weighting parameters of traffic beams receiving a "pass" by threshold comparitor 560, the present invention may select a "passing" traffic beam which provides the most antenna gain (e.g. a most narrow "passing" traffic beam). However, in the illustrated embodiment, as the forward and reverse links use different carrier frequencies, the beam forming parameters of the traffic beam identified as the optimum traffic beam configuration are further processed to provide a forward link beam configuration adapted for use with a different frequency. For example, the difference in carrier frequencies is known and, therefore, the beam forming parameters of the identified optimum traffic beam configuration may be adjusted to provide a same beam in forward link using a different carrier frequency.

Accordingly, using information determined in direction finding and angle spread estimator circuitry 160, transmit circuitry of base station 100 may be utilized to provide an optimized narrow beam for forward link communication with a subscriber unit, such as subscriber unit 190, which is adapted to provide a suitable communication link when a corresponding pilot signal is provided in a forward link beam having substantially different characteristics.

It should be appreciated that, although described above with reference to a single subscriber unit, operation of the present invention may be with respect to multiple subscriber units. Accordingly, the present invention may optimize beams for all subscriber units, or some portion thereof, operable within the network.

Figure 4:
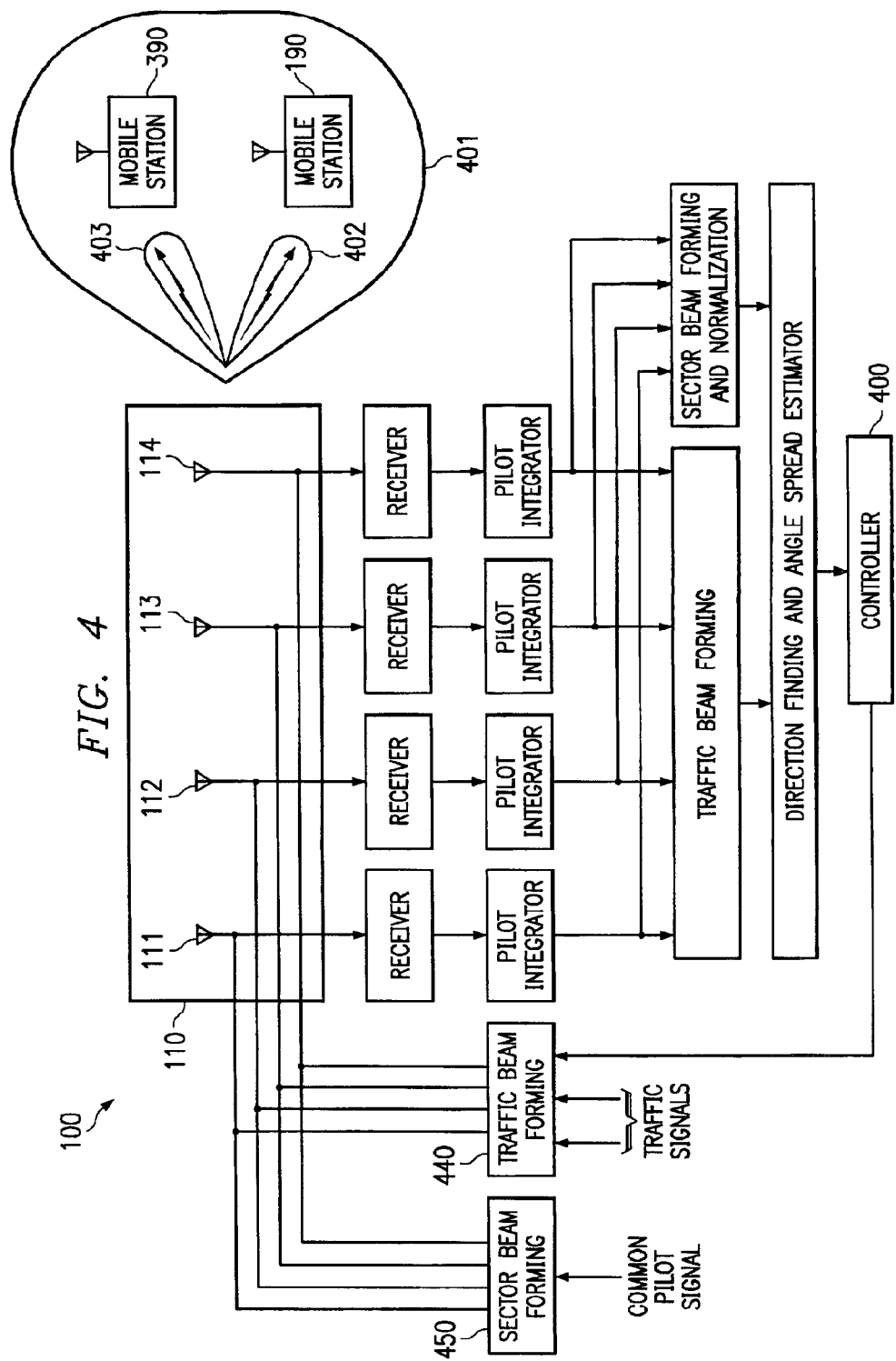
FIG. 4 shows forward link beam forming using the preferred embodiment base station circuitry of FIG. 1.

Directing attention to FIG. 4, a preferred embodiment of base station 100 having forward link circuitry adapted to provide forward link beams as described above is shown. Specifically, controller 400, such as may be a processor based system operable under control of an algorithm defining functionality as described herein, is coupled to direction finding and angle spread estimator circuitry 160. For example, controller 400 may be a general purpose processor based system, such as a computer system built on the INTEL PENTIUM processor platform, well known in the art. Although, not illustrated in FIG. 4, it should be appreciated that controller 400 may provide control signals to traffic beam forming circuitry 140 and/or sector beam forming circuitry 150 to provide operation thereof as described herein.

Preferably, controller 400 accepts information from direction finding and angle spread estimator circuitry 160 with respect to comparison of the traffic beams and the sector beam and identifies an optimum beam configuration. Controller 400, preferably determines a corresponding beam configuration for implementation in the forward link, as described above.

In operation according to the illustrated embodiment, controller 400 provides the control signals with respect to the proper weighting parameters for optimized forward link traffic beam forming to traffic beam forming circuitry 440. Accordingly, a traffic signal provided to traffic beam forming circuitry 440 associated with subscriber unit 190 may be provided to antennas 111–114 of antenna array 110 to form antenna beam 402 optimized for communication with mobile unit 190 with a corresponding common pilot signal provided in sector beam 401 as formed by sector beam forming circuitry 450.

It should be appreciated that the use of optimized beams according to the present invention may be relied upon to provide isolation between multiple subscriber units and, therefore, provide simultaneous communication links for increased system capacity. For example, in the above described preferred embodiment, the direction and angle spread for each subscriber unit is accurately estimated. Accordingly, subscriber units having optimized beams associated therewith which are spatially separated, i.e. cause negligible interference with respect to each other, can be simultaneously served according to the present invention. For example, referring still to FIG. 4, forward link optimized beam 402 may be utilized to provide a traffic signal to subscriber unit 190 simultaneously with forward link optimized beam 403 utilized to provide a traffic signal to subscriber unit 390.

A preferred embodiment of the present invention determines when particular subscriber units are spatially separated by finding the correlation between the subscriber unit's optimum beam weights. If the correlation is below a predefined threshold, then controller 400 may control base station 400 to transmit data to these two subscriber units simultaneously. Similarly, if it is desired to transmit data to three subscriber units simultaneously, the correlation between the third subscriber unit's optimum beam weight and the other subscriber unit's optimum beam weights may be found and, if below a predefined threshold, then controller 400 may control base station 400 to transmit data to these three subscriber units simultaneously. It should be appreciated that the use of correlation between the subscriber unit's optimum beam weights is not a limitation of the present invention identifying subscriber units for simultaneous service. For example, a beam width matrix may be utilized to identify multiple subscribers having sufficient spatial separation for simultaneous service according to the present invention. Moreover, the ability to simultaneously serve subscribers is not limited to the two or three subscriber units discussed above and, accordingly, may be any number of subscriber units having sufficient spatial separation.

It should be appreciated that the ability to provide such simultaneous communication links represents a potential for large increases in system capacity. For example, QUALCOMM's 1xEV-DO HDR systems provide for only one subscriber unit per sector to receive forward link data at a time (time division multiple access). However, the present invention may be utilized to provide forward link data to multiple subscriber units within a sector representing a 100% sector capacity increase for each such subscriber unit served simultaneously.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
    traffic beam forming circuitry operable to provide a plurality of traffic beams formed from a same signal;
    common use beam forming circuitry operable to provide a common use beam formed from said signal; and
    beam analysis circuitry coupled to said traffic beam forming circuitry and said common use beam forming circuitry, wherein said beam analysis circuitry operates to analyze each traffic beam of said plurality of traffic beams with respect to said common use beam.

2. The system of claim 1, wherein said signal is a pilot signal associated with a particular subscriber unit.

3. The system of claim 2, further comprising:
    pilot integration circuitry coupled to each of said traffic beam forming circuitry and said common use beam forming circuitry, wherein said pilot integration circuitry provides independent integration of said pilot signal as communicated by different antenna elements of an antenna array.

4. The system of claim 3, wherein an integration period of said pilot integration circuitry is established to be shorter than a Doppler period associated with said system.

5. The system of claim 3, wherein an integration period of said pilot integration circuitry is in the range of from about 1 millisecond to about 3 milliseconds.

6. The system of claim 1, wherein said plurality of traffic beams include a plurality of traffic beams having a same bore sight direction and a different other beam attribute.

7. The system of claim 6, wherein said different other beam attribute includes a beam width.

8. The system of claim 6, wherein said different other beam attribute includes a signal gain.

9. The system of claim 1, wherein said plurality of traffic beams include a plurality of beams having different bore sights in substantially equal increments throughout a beam width associated with said common use beam.

10. The system of claim 9, wherein said substantially equal increments are approximately 1 degree increments.

11. The system of claim 1, wherein said common use beam substantially provides a sector beam configuration.

12. The system of claim 1, wherein said common use beam provides a beam width configuration substantially wider than a plurality of beam width configurations of said plurality of traffic beams.

13. The system of claim 1, wherein said common use beam is formed with respect to a first link direction and emulates a beam utilized in conducting communications in a second link direction.

14. The system of claim 1, further comprising:

an antenna array having a plurality of antenna elements disposed in a predetermined geometry to facilitate beam forming by said traffic beam forming circuitry and said common use beam forming circuitry, wherein said signal as communicated by different antenna elements of said antenna array is provided discretely between said antenna array and said traffic beam forming circuitry and between said antenna array and said common use beam forming circuitry.

15. The system of claim 14, wherein said antenna array is a small aperture antenna array.

16. The system of claim 1, wherein said traffic beam forming circuitry and said common use beam forming circuitry form beams in a first link direction, thereby providing first link direction traffic beam forming circuitry and first link direction common use beam forming circuitry, said system further comprising:

second link direction traffic beam forming circuitry operable to provide a plurality of traffic beams formed from traffic signals communicated by said system, wherein an optimum traffic beam configuration is identified from said analysis of each traffic beam of said plurality of traffic beams with respect to said common use beam provided by said analysis circuitry, and wherein a traffic beam formed with respect to a particular traffic signal is formed as a function of said optimum traffic beam configuration; and second link direction common use beam forming circuitry operable to provide a common use beam formed from a common use signal communicated by said system.

17. The system of claim 16, wherein at least two traffic beams of said plurality of traffic beams are provided simultaneously by said second link direction traffic beam forming circuitry.

18. The system of claim 17, wherein said at least two traffic beams are selected at least in part from spatial information with respect to said at least two traffic beams.

19. A method comprising:

forming a plurality of traffic beams having different attributes from a same signal;

forming a common use beam from said signal; and analyzing each traffic beam of said plurality of traffic beams with respect to said common use beam to thereby identify a traffic beam of said plurality of traffic beams having a highest combined signal power level and phase correlation to said common use beam.

20. The method of claim 19, wherein said signal is a signal associated with a particular subscriber unit.

21. The method of claim 20, wherein said signal is a pilot signal.

22. The method of claim 20, further comprising:

integrating said signal as communicated by different antenna elements of an antenna array.

23. The method of claim 22, wherein an integration period associated with said integrating said signal is shorter than a Doppler period associated with said particular subscriber unit.

24. The method of claim 22, wherein an integration period associated with said integrating said signal is in the range of from about 1 millisecond to about 3 milliseconds.

25. The method of claim 19, wherein said plurality of traffic beams include a plurality of traffic beams having a same bore sight direction and a different other beam attribute.

26. The method of claim 25, wherein said different other beam attribute includes a beam width.

27. The method of claim 25, wherein said different other beam attribute includes a signal gain.

28. The method of claim 19, wherein said plurality of traffic beams include a plurality of beams having different bore sights in substantially equal increments throughout a beam width associated with said common use beam.

29. The method of claim 28, wherein said substantially equal increments are approximately 1 degree increments.

30. The method of claim 19, wherein said common use beam substantially provides a sector beam configuration.

31. The method of claim 19, wherein said common use beam provides a beam width configuration substantially wider than a plurality of beam width configurations of said plurality of traffic beams.

32. The method of claim 19, wherein said common use beam is formed with respect to a first link direction and emulates a common use beam utilized in conducting communications in a second link direction.

33. The method of claim 19, further comprising:

forming a first traffic beam having attributes derived from said identified traffic beam to communicate a first traffic signal having a common use signal associated therewith; and forming a common use beam having attributes consistent with that of said common use beam formed from said signal to communicate said common use signal.

34. The method of claim 33, further comprising:

forming a second traffic beam to communicate a second traffic beam having said common use signal associated therewith, wherein said first traffic signal and said second traffic signal are communicated simultaneously.

35. The method of claim 34, wherein said first traffic beam and said second traffic beam are selected at least in part from spatial information with respect to said at least two traffic beams.

36. A method of providing optimized forward link traffic beams in a communication system, said method comprising:

emulating a forward link channel characteristic in the reverse link;

forming a plurality of beams having different attributes in said reverse link;

identifying a beam configuration of said plurality of beams having a most desirable attribute with respect to said emulated forward link channel characteristic; and providing said optimized forward link traffic beam as a function of said identified beam configuration.

37. The method of claim 36, wherein said emulated forward link channel characteristic is associated with a common pilot used in said forward link.

38. The method of claim 37, wherein said emulated forward link channel characteristic is a beam width.

39. The method of claim 38, wherein said beam width is a sector beam width.

40. The method of claim 36, wherein said plurality of beams include a plurality of beams having a same bore sight direction and a different other beam attribute.

41. The method of claim 36, wherein said plurality of beams include a plurality of beams having different bore sights in substantially equal increments.

42. The method of claim 36, wherein said most desirable attribute includes a most desirable phase match and signal gain combination.

43. The method of claim 36, further comprising:
providing another independently optimized forward link beam simultaneously with providing said optimized forward link traffic beam, wherein traffic signals communicated in each of said optimized forward link beams have a same pilot signal associated therewith.

* * * * *